US011979477B2

(12) United States Patent
Scahill et al.

(10) Patent No.: US 11,979,477 B2
(45) Date of Patent: May 7, 2024

(54) PROCESSING LOCAL AREA NETWORK DIAGNOSTIC DATA

(71) Applicant: British Telecommunications Public Limited Company, London (GB)

(72) Inventors: Francis Scahill, London (GB); Richard Evenden, London (GB)

(73) Assignee: British Telecommunications Public Limited Company (GB)

( * ) Notice: Subject to any disclaimer, the term of this patent is extended or adjusted under 35 U.S.C. 154(b) by 244 days.

(21) Appl. No.: 17/754,172

(22) PCT Filed: Sep. 15, 2020

(86) PCT No.: PCT/EP2020/075775
§ 371 (c)(1),
(2) Date: Mar. 25, 2022

(87) PCT Pub. No.: WO2021/063671
PCT Pub. Date: Apr. 8, 2021

(65) Prior Publication Data
US 2022/0294880 A1 Sep. 15, 2022

(30) Foreign Application Priority Data
Sep. 30, 2019 (EP) ................................. 19200631

(51) Int. Cl.
*H04L 69/22* (2022.01)
*H04L 43/026* (2022.01)
(Continued)

(52) U.S. Cl.
CPC ............ *H04L 69/04* (2013.01); *H04L 43/026* (2013.01); *H04L 43/04* (2013.01); *H04L 47/13* (2013.01); *H04L 69/22* (2013.01); *H04W 28/06* (2013.01)

(58) Field of Classification Search
None
See application file for complete search history.

(56) References Cited

U.S. PATENT DOCUMENTS 6,041,351 A 3/2000 Kho
7,460,476 B1 12/2008 Morris et al.
(Continued)

FOREIGN PATENT DOCUMENTS

CN 107409071 B 8/2020
EP 1180871 B1 11/2007
(Continued)

OTHER PUBLICATIONS

Examination Report under section 18(3) for GB Application No. GB1810384.6, dated Dec. 10, 2020, 4 pages.
(Continued)

*Primary Examiner* — Robert M Morlan
(74) *Attorney, Agent, or Firm* — Pranger Law PC

(57) ABSTRACT

Methods and apparatus are disclosed for processing local area network (LAN) diagnostic data obtained in respect of a LAN, the LAN having at least one user-device located therein operable to communicate via a LAN gateway device with one or more remote devices in a communications network outside the LAN, the LAN gateway device having a wireless interface associated therewith in the LAN, the LAN diagnostic data including data packets received via the wireless interface at least some of which carry performance data relating to one or more predetermined performance characteristics of the LAN.

16 Claims, 4 Drawing Sheets

(51) Int. Cl.
  *H04L 43/04* (2022.01)
  *H04L 47/10* (2022.01)
  *H04L 69/04* (2022.01)
  *H04W 28/06* (2009.01)

(56) References Cited

U.S. PATENT DOCUMENTS

| | | | |
|---|---|---|---|
| 8,874,741 | B2 | 10/2014 | Hassan et al. |
| 9,300,599 | B2 | 3/2016 | Pope et al. |
| 10,757,228 | B1 | 8/2020 | Bhimavarapu et al. |
| 2004/0221132 | A1 | 11/2004 | Torkelsson et al. |
| 2006/0010249 | A1* | 1/2006 | Sabesan ............... H04L 45/02 709/238 |
| 2007/0189176 | A1 | 8/2007 | Milne et al. |
| 2009/0281984 | A1 | 11/2009 | Black |
| 2014/0040464 | A1 | 2/2014 | Singhal et al. |
| 2014/0233564 | A1 | 8/2014 | Lue et al. |
| 2015/0237179 | A1 | 8/2015 | Sridhar et al. |
| 2015/0289152 | A1 | 10/2015 | Shanmugam et al. |
| 2016/0212031 | A1 | 7/2016 | Jain et al. |
| 2016/0309345 | A1 | 10/2016 | Tehrani et al. |
| 2017/0099197 | A1 | 4/2017 | Raney |
| 2017/0250889 | A1 | 8/2017 | Vogt et al. |
| 2017/0359735 | A1 | 12/2017 | Jain et al. |
| 2019/0259226 | A1 | 8/2019 | Khalifeh et al. |
| 2020/0304397 | A1 | 9/2020 | Smith et al. |
| 2020/0322826 | A1 | 10/2020 | Wangler et al. |
| 2020/0344129 | A1 | 10/2020 | Hild |
| 2022/0239575 | A1* | 7/2022 | Arneja ............... H04L 41/0627 |
| 2023/0087454 | A1* | 3/2023 | Cheng ............... H04L 43/10 709/224 |

FOREIGN PATENT DOCUMENTS

| | | |
|---|---|---|
| EP | 2784984 A1 | 10/2014 |
| EP | 2801937 A1 | 11/2014 |
| WO | WO-2012175132 A1 | 12/2012 |
| WO | WO-2016123383 A3 | 9/2016 |
| WO | WO-2017112260 A1 | 6/2017 |
| WO | WO-2020002158 A1 | 1/2020 |
| WO | WO-2020002159 A1 | 1/2020 |

OTHER PUBLICATIONS

Extended Search Report for European Application No. 19200631.0 dated Jan. 22, 2020, 10 pages.
Goldschneider J R., "Lossy Compression of Scientific Data via Wavelets and Vector Quantization," 1997, 204 pages.
Gupta P., "Algorithms for Packet Classification," 29 pages.
GZIP "GNU GZIP: General file (de)compression," Jan. 2018, retrieved https://www.gnu.org/software/gzip/maunal/gzip.html, retrieved on Mar. 28, 2018, 8 pages.
Hansch G., et al., "Packet-wise Compression and Forwarding of Industrial Network Captures," Sep. 21, 2017, 9th IEEE International Conference on Intelligent Data Acquisition and Advanced Computing Systems: Technology and Applications, published on Nov. 7, 2017, 5 pages.
International Search Report and Written Opinion for Application No. PCT/EP2019/066511, dated Aug. 5, 2019, 14 pages.
International Search Report and Written Opinion for Application No. PCT/EP2019/066513, dated Aug. 5, 2019, 16 pages.
International Search Report and Written Opinion for Application No. PCT/EP2020/075775, dated Dec. 7, 2020, 13 pages.
Office Action for Chinese Application No. 201980042025.9 dated May 20, 2021, 10 pages.
Search Report for GB Application No. 1914094.6, dated Jul. 3, 2020, 4 pages.
Seytnazarov S., et al., "Qos-aware adaptive MPDU aggregation of VoIP traffic on IEEE 802.11n WLANs," Nov. 17, 2014, 4 pages.
https://www.radiotap.org/; retrieved on Mar. 28, 2022, 4 pages.
http://www.radiotap.org/fields/Vendor%20Namespace.html; retrieved on Mar. 28, 2022, 1 page.

* cited by examiner

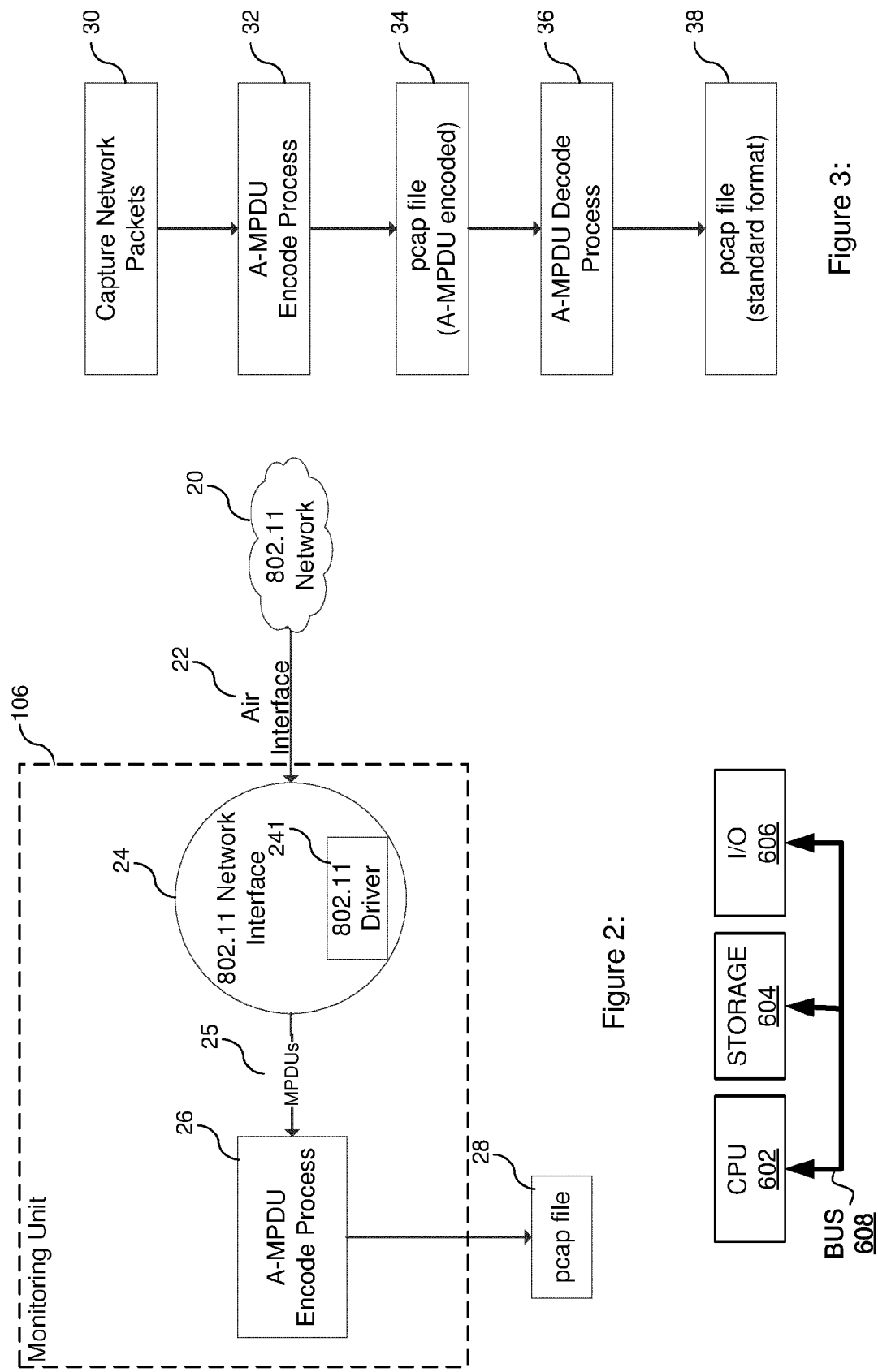

PROCESSING LOCAL AREA NETWORK DIAGNOSTIC DATA

PRIORITY CLAIM

The present application is a National Phase entry of PCT Application No. PCT/EP2020/075775, filed Sep. 15, 2020, which claims priority from EP Patent Application No. 19200631.0, filed Sep. 30, 2019, each of which is hereby fully incorporated herein by reference.

TECHNICAL FIELD

The present disclosure relates to methods of and systems for processing local area network diagnostic data obtained in respect of a local area network. In particular, embodiments of the disclosure relate to techniques and apparatus for use in relation to the processing of such diagnostic data captured in a local area network such that the diagnostic data may subsequently be compressed and uploaded to (for example) an Internet Service Provider, or otherwise prepared for subsequent analysis, network diagnostics and other such processing.

BACKGROUND

In network diagnostics systems that rely on capturing and analyzing every packet transmitted over a network, the amount of storage, bandwidth and processing required is dependent on both the number of packets captured and on the average size of a packet. It is advantageous therefore to reduce both the number of packets and the size of the packets that are captured and processed.

It is common in packet capture or data transmission systems to use compression algorithms such as GZIP compression (discussed later) to reduce the size of packet captures. Compression can be applied on a packet-by-packet basis or across a block of multiple packets depending on the acceptable delay and the desired compression ratio required. GZIP-based packet compression has the advantage of being a "lossless" compression scheme and ensures that all packets can be recreated perfectly when decompressed, however this limits the maximum amount of compression that is possible.

In IEEE 802.11 based WiFi systems, certain packets are transmitted regularly, independently of whether or not there are active users of the access point in question. For example, WiFi "beacon" packets are transmitted every 100 msecs for each distinct access point BSSID (i.e. Basic Service Set IDentifier) that is operating. For WiFi routers such as the BT "Home Hub", a current version of which supports six independent access points operating in parallel, beacon transmissions can account for 6×10×3600×24=5,184,000 packets per day within the packet capture. Each beacon packet transmitted is essentially identical to all other beacons with the exception of a small set of fields including: the Traffic Indication Map, QBSS (i.e. QoS-enhanced Basic Service Set) Load (where "QoS" refers to "Quality of Service"), Sequence Number and Timestamp elements which may or may not differ between consecutive beacons. Depending on the type of diagnostics performed, these fields may not be relevant or useful in subsequent analysis, however their presence creates differences between packets which limit the performance of compression algorithms.

Whilst the size of a packet capture affects the amount of storage and bandwidth required to upload the capture, it is (at least primarily) the number of packets within the packet capture that determines how much CPU processing power is required to analyze the packet capture, so it is still advantageous to remove small packets even if this does not make a significant difference to the compressed packet capture file size.

It will be appreciated that the data units in question will generally be regarded as frames in relation to their transfer at Layer 2 (the "Data Link Layer" or "DLL") according to the OSI Model, and as packets in relation to their transfer at Layer 3 (the "Network Layer"), but since the frames in question are encapsulated within packets in order for the data in question to be uploaded as part of a packet capture, the issues above are applicable whether the data units in question are regarded as being frames or packets, in particular since the number and sizes of the packets in a packet capture will depend to a large extent on the number and sizes of the frames they carry.

Referring to some existing techniques, GZIP (referred to earlier) is a file format and software application used for file compression and decompression. Briefly, GZIP compression uses Liv-Zempel (LZ) compression to replace identical byte sequences in data with a single instance, and is therefore able to compress data very efficiently. LZ algorithms achieve compression by replacing repeated occurrences of data with references to a single copy of that data existing earlier in the uncompressed data stream. A match is encoded by a pair of numbers called a "length-distance pair", which is essentially equivalent to the statement "each of the next [length] characters is equal to the characters exactly [distance] characters behind it in the uncompressed stream". The longer the byte sequences that can be replaced, the more efficient the compression can be.

ZIP compression is a lossless compression technique, however, and does not take account of insignificant differences between byte sequences (e.g. fields within packet contents having similar but non-identical values, or fields where the value is variable but unimportant are not compressed). Also, while ZIP-compression can generally reduce the size of packet captures, it does not generally reduce the number of packets after decompression since each packet generally has at least a unique packet number and/or timestamp, so GZIP compression does not necessarily reduce the processing requirements of back-end analytics systems. More information about GZIP is available online on a web-page entitled "GNU Gzip" available at: www.gnu.org and elsewhere.

"Wireshark" provides a data capturing technique that "understands" the structure (i.e. the encapsulation) of various networking protocols. It can parse and display the fields, along with their meanings as specified by different networking protocols. Wireshark uses the "pcap" (packet capture) application programming interface (API) to capture packets, so can only capture packets on the types of networks that "pcap" supports.

Within Wireshark, the "Editcap" functionality is capable of removing duplicate packets ("Packet Deduplication") in a packet capture. To identify identical packets, Wireshark generates a hash-value based on the packet contents and stores the historical hash-values for a configurable historical window defined either by absolute time or by number of packets. If the current packet hash is the same as the hash for any previous packets within the window then the current packet is dropped. The packet hash-function can be configured to ignore a fixed number of bytes from the start of the packet, but this number is the same for all packet types and is a prefix only. Typically this is to allow timestamps and/or frame numbers to be ignored when calculating the packet hash. However the same fixed number of bytes are ignored from all packets. Further, the duplicate packet is removed in Wireshark, and no record is retained of this packet, meaning it cannot be reinstated afterwards even if needed.

A paper by Pankaj Gupta and Nick McKeown entitled "Algorithms for Packet Classification" (IEEE Network: Magazine of Global Internetworking, Vol 15, Issue 2, March 2001, pages 24-32), available online at yuba.stanford.edu describes packet classification techniques which are used to group packets into semantically similar classes to allow class-specific processing such as traffic-shaping or identification to be applied to the packet. Packet classifiers may use different subsets of the packet fields dependent on the packet type to match a packet to various classes, i.e. a packet classifier may define a similarity measure by which a packet may be compared to other packets.

A paper by Jill R. Goldschneider entitled "Lossy Compression of Scientific Data via Wavelets and Vector Quantization" (February 2000), which is available online at digitallib.washington.edu discusses lossy compression for data transmission. In Vector Quantization (VQ) based data compression the packet payloads are replaced with the index of the nearest codebook entry. The VQ algorithm uses a distance/similarity measure to compare payload contents in order to find the nearest codebook entry. Typically a single distance metric is applied to all the payload contents. In a VQ system the codebook is typically predefined and is not dynamically generated from the content, and the system relies on the payloads typically being fixed dimensionality data of a single type (e.g. speech data, image data or sensor data).

A paper by Shinnazar Seytnazarov et al. entitled: "QoS-Aware Adaptive MPDU Aggregation of VoIP Traffic on IEEE 802.11n WLANs", 10th International Conference on Network and Service Management (CNSM) and Workshop, IFIP, 17 Nov. 2014 (2014 Nov. 17), pages 356-359, proposes a QoS-aware Adaptive MPDU aggregation scheduler which applies aggregation to voice traffic and adaptively adjusts the aggregation size based on time-varying end-to-end delay and WLAN contention, and QoS requirements.

Referring now to patent documents, U.S. Pat. No. 6,041,351 ("Kho") relates to a technique for mitigating network congestion through instruction size reduction. Server instruction to client is stored in most-recently-used (MRU) cache, such that subsequent retransmission attempt of such instruction is detected, avoided, and instead executed locally from cache. Storage performance is tuned optimally to achieve partial avoidance effect according to graphical or text types, and dynamically adaptable as instruction characteristic changes. MRU First-In/First-Out (FIFO) cache provides processors with local checking of new instructions in process for network transmission against most recently executed instructions, thereby avoiding repeat transmissions of instructions already accessible locally. More than one instruction set or packet may also be evaluated, stored and monitored similarly, but instruction subsets may be executed selectively. Each processor maintains same cache information synchronously.

International Patent Application Pub. No. WO2016123383 ("Quantum Metric LLC") relates to techniques for compact data storage of network traffic and efficient search thereof. Network traffic may be compared to communications in previous network traffic to identify any differences. Resource templates may be generated for different (e.g. new) resources identified in network traffic. Storage of the different resources identified in network traffic enables compression of the traffic. Similarity matching may be implemented to improve processing performance for compact storage of network traffic, including determining differences in the traffic for storage.

United States Patent Application Pub. No. 2009/0281984 ("Black") relates to methods of capturing and compressing trace data for use in network packet traffic analysis. In one version, when a packet is received, two records of the packet are created and stored. One record is stored in a file associated with the source address of the packet and the other record is stored in a file associated with the destination address of the packet. Various packet compression techniques are described and one example compares a newly received packet to the previous packet which has been stored in the same file and sets bits in the record which denote whether fields in the newly received packet are the same as the corresponding fields in the previous packet.

United States Patent Application Pub. No. 2014/0040464 ("Singhal et al,") relates to a network monitoring system that summarizes a plurality of data packets of a session into a compact session record for storage and processing. Each session record may be produced in real-time and made available during the session and/or after the termination of the session. Depending on protocols, a network monitoring system extracts different sets of information, removes redundant information from the plurality of data packets, and adds performance information to produce the session record. The network monitoring system may retrieve and process a single session record or multiple session records for the same or different protocols to determine cause of events, resolve issues in a network or evaluate network performance or conditions.

The applicant filed two co-pending International Patent Applications on 21 Jun. 2019, having International Patent Application Pub. Nos. WO 2020/002158 and WO 2020/002159, respectively.

SUMMARY

As explained earlier, it is common in packet capture or data transmission systems to use compression algorithms such as GZIP compression to reduce the size of packet captures, GZIP-based packet compression being a lossless compression scheme which ensures that all packets can be recreated perfectly when decompressed. In a network diagnostics system, however (as opposed to a communication system), it is not necessarily important to have a lossless version of the original packet capture since subsequent diagnostics and analysis may depend only on subsets of the packet fields which are relevant to the diagnostic analysis. The present inventors have therefore identified an opportunity to exploit this redundant information to reduce the size and/or number of packets in a packet capture used for diagnostic purposes by using lossy compression techniques to improve the level of compression possible.

Aspects and embodiments of the disclosure relate to techniques and apparatus for processing Local Area Network (LAN) diagnostic data (often referred to as network Packet CAPtures or "PCAPs") from a LAN, possibly prior to standard or other compression and/or uploading, possibly to (for example) an Internet Service Provider (ISP) for analysis, network diagnostics and other such processing elsewhere. Such diagnostic data would generally be received and processed by a LAN gateway device (such as a LAN router/modem device or "Home Hub") located topologically at the boundary of the LAN, which would generally serve as the entry/exit point for data entering/exiting the LAN, or by a module associated therewith, before being uploaded via or from such a gateway device for analysis elsewhere, but the processed data could be stored locally (having also been compressed using standard compression techniques, for example) for provision in other ways to an analysis entity. In particular, embodiments of the disclosure are concerned with the issue of how to reduce the size of network packet captures or other such diagnostic data that are to be uploaded for analysis by an ISP or party acting on behalf of an ISP, possibly using a cloud server. Such packet captures can be large, with high bandwidth and storage requirements, so it is advantageous to use compression before uploading them.

While the data to be uploaded generally includes a significant proportion of similar packets of standard types, the majority of the data within which is not generally relevant to the subsequent diagnostic analysis, standard PCAP analysis techniques generally require uploaded data to be in a standard format, and "expect" these packets to be present and complete (essentially, the correct functioning of the analysis techniques relies on them being present and complete).

According to a first aspect of the disclosure, there is provided a method of processing local area network diagnostic data obtained in respect of a local area network, the local area network having at least one user-device located therein operable to communicate via a local area network gateway device with one or more remote devices in a communications network outside the local area network, the local area network gateway device having a wireless interface associated therewith in the local area network, the local area network diagnostic data comprising data packets received via the wireless interface at least some of which carry performance data in one or more header fields relating to one or more predetermined performance characteristics of the local area network, the method comprising: identifying from packets received via the wireless interface a plurality of packets each having an indication that they belong to a particular aggregate group of packets; selecting from the plurality of packets identified as having an indication that they belong to a particular aggregate group of packets at least two packets that carry performance data relating to a performance characteristic of the local area network; identifying from the at least two packets carrying performance data relating to a performance characteristic of the local area network, at least one set of two or more packets sharing the same source and destination addresses; replacing packets identified as being in a set of two or more packets sharing the same source and destination addresses with a single packet having the shared source and destination address and having one or more header fields corresponding to those identified as being in the set of two or more packets; and updating the aggregate group of packets from which the at least two packets that carry performance data were selected by including the replacement packet therein instead of the set of two or more packets having the same source and destination addresses.

By replacing originally-received packets identified as being in a set of two or more packets sharing the same source and destination addresses with a replacement packet having the shared source and destination address and having one or more header fields corresponding to those identified as being in the set of two or more packets, it will be appreciated that the replacement packet therefore conforms to the same protocol as the originally-received packets and/or will carry performance data in one or more header fields in a header conforming to the same protocol as (or otherwise be sufficiently similar to) the headers of the packets it replaces. The replacement packet and/or information contained in the one or more fields in the header in question can therefore be analyzed using the same analysis tool or process as would have been used for the originally-received packets it has replaced if they had not been replaced.

According to some embodiments, some or all of the operations of such a method may be implemented in an entity such as a monitoring unit configured as a module of a device such as LAN Gateway device, or as a module associated with a device such as LAN Gateway device According to some embodiments, the local area network diagnostic data obtained in respect of the local area network may comprise a plurality of packets conforming to a predetermined version of a network protocol. In particular, the local area network diagnostic data obtained in respect of the local area network may comprise a plurality of packets conforming to a predetermined wireless networking protocol.

According to some embodiments, the method may be performed in respect of packets conforming to the 802.11 protocol (which may be referred to as "WiFi packets"), and in particular in respect of Media Access Control Protocol Data Units (MPDUs) received via a wireless interface of an 802.11-capable device. Such packets would in general comprise:

(i) Media Access Control ("MAC") header, which would generally contain information relating to frame control, MAC addressing, duration, and sequence control.
(ii) Frame body, which would generally contain information relating to frame types or subtypes and the MAC Service Data Unit (MSDU) payload that is encrypted (when encryption is used). The frame body can vary in size for different 802.11 frames.
(iii) Frame Check Sequence (FCS), which would generally contain a 32-bit cyclic-redundancy check (CRC) to verify the integrity of the MSDU data frames.
(iv) Additionally a received packet (i.e. generally comprised of the MAC Header, Frame body and FCS) will generally have a RadioTap (or other format type) header pre-pended (by the receiver, e.g. a WiFi Driver) to give higher processing layers (in the receiver) more information relating to the received packet (e.g. rate at which the packet was sent, coding mechanisms, A-MPDU identifiers, etc.).

Some embodiments make use of the "Aggregated-PDU" mechanism that the 802.11 protocol uses over the physical layer in order to re-aggregate (in a lossy way) multiple WiFi Packets into a single WiFi Packet.

According to some embodiments, the single packet having the shared source and destination address of the two or more packets the single packet replaces may include performance data from at least one of the two or more packets the single packet replaces. In general, all QoS ("Quality of Service", or performance) MPDUs in an A-MPDU would have the same QoS value, so in such scenarios, the single packet may include the performance data from any of the packets it replaces.

QoS (or "performance") Data MPDUs belonging to the same aggregate group and having the same source and destination addresses generally form the majority of packet types in a single aggregate group. Some embodiments make use of the similarity between packets of this type as this allows them to be summarized in a single MPDU, generally using a RadioTap or similar header to hold the summary information.

According to some embodiments, the single packet having the shared source and destination address of the two or more packets the single packet replaces may include an indication of the size of the single packet. In such embodiments, the indication of the size of the single packet may be an indication of the total number of bytes in the single packet and/or of the number of packets the single packet replaces, or may indicate the packet size in another way.

According to some embodiments, the single packet having the shared source and destination address of the two or more packets the single packet replaces may include one or more of the following:
- a starting sequence number of the first packet of the plurality of packets each having an indication that they belong to a particular aggregate group of packets;
- a bitmask indicating a sequence number of each packet of the plurality of packets each having an indication that they belong to a particular aggregate group of packets;
- a bitmask indicating a retry flag of each packet of the plurality of packets each having an indication that they belong to a particular aggregate group of packets;

but other data may be included therein.

According to some embodiments, the method may comprise discarding a payload section of one or more of the plurality of packets each having an indication that they belong to a particular aggregate group of packets. While another instance of such packets may be maintained as it is and forwarded complete with its payload section, the payload data of packets to be processed according to the present method may be discarded as it is not generally of relevance to performance analysis in respect of a wireless network.

According to some embodiments, the plurality of packets identified from packets received via the wireless interface and each having an indication that they belong to a particular aggregate group of packets may comprise a plurality of Media Access Control Protocol Data Units (i.e. MPDUs) belonging to the same Aggregated Media Access Control Protocol Data Unit (i.e. an A-MPDU).

According to some embodiments, the at least two packets that carry performance data relating to a performance characteristics of the local area network may be Quality of Service Data Media Access Control Protocol Data Units (i.e. QoS MPDUs).

According to some embodiments, the method may comprise combining a plurality of Quality of Service Data Media Access Control Protocol Data Units belonging to the same belonging to the same Aggregated Media Access Control Protocol Data Unit into a single Quality of Service Data Summary Media Access Control Protocol Data Unit.

According to some embodiments, the method may further comprise a step of subjecting one or more updated aggregate groups of packets (i.e. updated according to an embodiment of the above aspect) to further compression using a standard and/or predetermined packet compression technique, for example.

According to some embodiments, the method may further comprise sending one or more updated aggregate groups of packets (possibly further compressed using a standard and/or predetermined packet compression technique) from the local area network for local area network performance analysis at a remote network diagnostic device in the communications network outside the local area network.

While such further compression and transmission stages are not necessary, in scenarios where data packets received via a wireless interface are processed using a method according to an embodiment of the above aspect are written to a "PCAP" file having a reduced size, the (reduced size) PCAP file can then be further compressed (e.g. using ZIP compression) and transmitted to another (i.e. remote) destination for processing elsewhere.

According to some embodiments where the updated (i.e. reduced-size) and possibly further compressed aggregate group or groups of packets is/are transmitted to another destination, the method may further comprise performing local area network performance analysis at said remote network diagnostic device in dependence on the one or more updated aggregate groups of packets from the local area network.

According to a second aspect of the disclosure, there is provided apparatus configured to perform a method according to any of the above methods.

According to some embodiments, such apparatus may be a monitoring unit configured as a module of a device such as LAN Gateway device, or as a module associated with a device such as LAN Gateway device.

The various options and embodiments referred to above in relation to the first aspect are also applicable in relation to the second aspect.

BRIEF DESCRIPTION OF THE DRAWINGS

Embodiments of the present disclosure will now be described with reference to the appended drawings, in which:

FIG. 2 illustrates the primary entities which may be comprised in a monitoring unit in (or associated with) a LAN Gateway device, in communication with a wireless network.

FIG. 3 illustrates how captured packets received in a wireless network may be formed into a pcap file using a method according to one embodiment, and subsequently be decoded to form another pcap file in a standard pcap format.

FIG. 6 is a block diagram of a computer system suitable for the operation of embodiments of the present disclosure.

DESCRIPTION

With reference to the accompanying figures, methods and apparatus according to various embodiments will be described.

Figure 1:
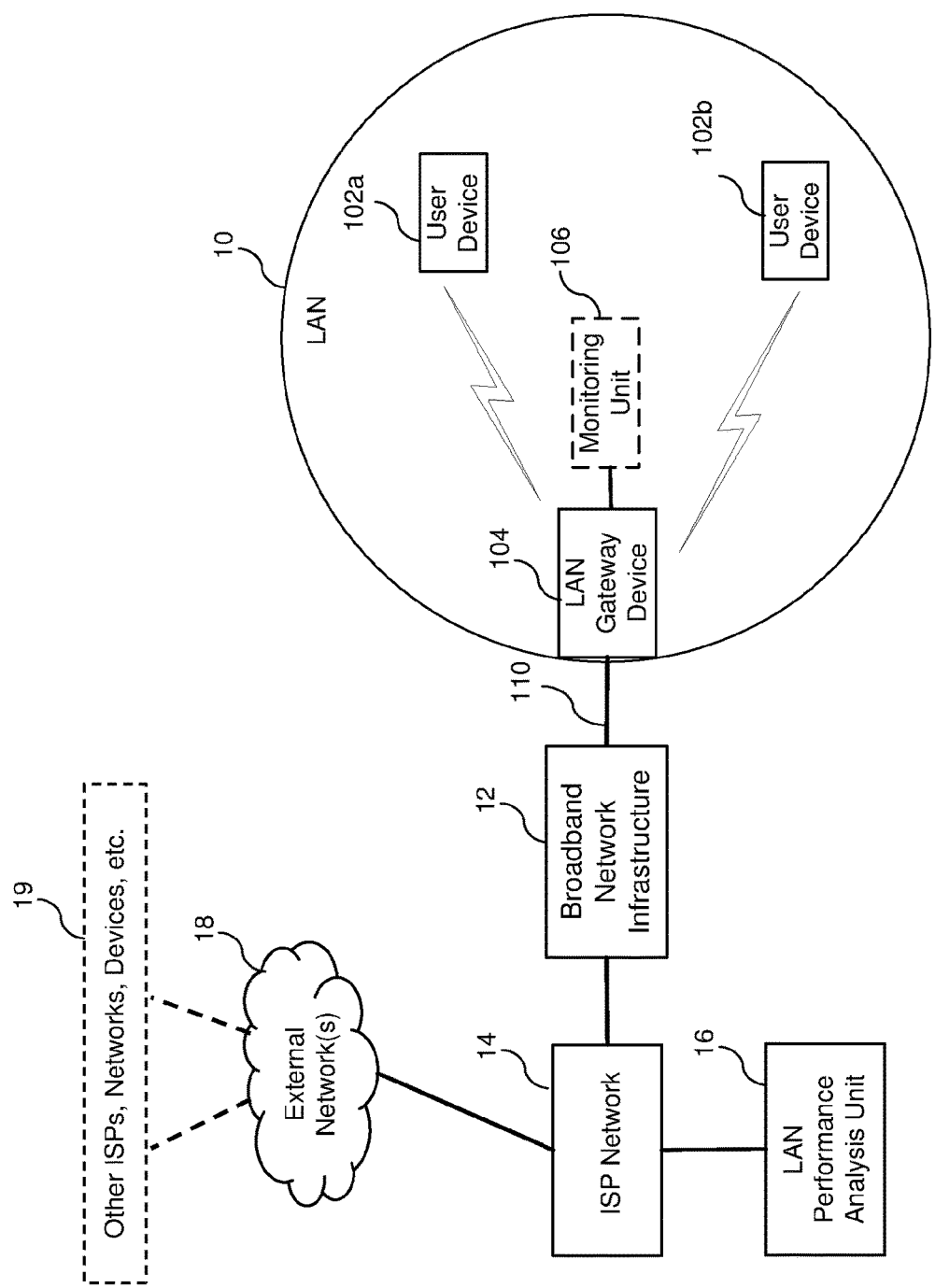
FIG. 1 shows a Local Area Network and entities and other networks with which devices in such a Local Area Network may communicate.

Referring to FIG. 1, this shows a Local Area Network (LAN) 10 within which are one or more user devices 102a, 102b such as computers, smart-phones, internet-enabled televisions etc. (generally 102) and a LAN gateway device 104, which may comprise a LAN router/modem device or "Home Hub" and/or other Network Termination Equipment (NTE). The user devices 102 may communicate via wired or wireless connections with the LAN gateway device 104, but in the present example, the LAN gateway device 104 is also capable of operating as the wireless hub of a wireless LAN. The LAN gateway device 104 is located topologically at the boundary of the LAN 10, and serves as the entry/exit point for data entering/exiting the LAN when a user device 102 within the LAN communicates with a device in a network outside the LAN.

Also shown within the LAN 10 in FIG. 1 is a monitoring unit 106. In the present example, the LAN gateway device 104 is in communication via a connection 110 with broadband network infrastructure 12. The connection 110 may for example be a Dynamic Subscriber Line (DSL) connection over a public switched telephone network (PSTN) line or otherwise, in which case the broadband network infrastructure 12 may include a Digital Subscriber Line Access Multiplexer (DSLAM) with an associated element manager allowing the performance of the DSL connection to be monitored and adjusted by way of Dynamic Line Management (DLM) techniques. Alternatively, the connection 110 may be a fiber connection, or otherwise.

In the present example, irrespective of the type of broadband connection, the broadband network infrastructure 12 is generally in communication with an Internet Service Provider (ISP) network 14, via which a user device 102 in the LAN 10 (and other devices in the ISP network 14) may communicate via one or more other external networks 18 (e.g., the Internet) with servers and other devices 19 in other networks (e.g. other ISP networks, etc.). In an alternative example, the network in question may be a corporate network, possibly across multiple sites, in which case the network infrastructure via which the individual sites are in communication with each other and/or with external networks 18 and other devices 19 (including a LAN performance analysis unit 16, to be discussed below) may be a corporate Wide Area Network (WAN) or similar, for example, rather than the broadband network infrastructure 12 and ISP network 14 shown in FIG. 1.

Also shown in FIG. 1 is a LAN performance analysis unit 16. This is shown as being in communication with the ISP network 14, but it may in fact be within the ISP network 14, or located elsewhere. It may be under the control of the ISP, but may alternatively be a separate entity in communication therewith or otherwise in communication with the LAN gateway device 104 in the LAN 10. A role of the LAN performance analysis unit 16 may be to receive diagnostic data obtained in respect of one or more LANs such as LAN 10, generally in the form of packet captures, and carry out performance and/or other diagnostic analysis and/or other processing in respect of the LAN diagnostic data.

As explained earlier, the size of a packet capture affects the amount of storage and bandwidth which would be required if the packet capture is to be uploaded to the ISP or to another entity which is to receive and process the diagnostic data therein, so it is advantageous if the size of the packet capture (measured in bytes, for example) can be reduced prior to the packet capture being sent from the LAN gateway device 104 (or other device in the LAN 10) to the ISP or other such processing entity, provided this can be done in such a way as to preserve the "relevant" information contained in the packet capture (i.e. information of relevance to any subsequent diagnostic analysis), ideally preserving it in a form that allows the necessary processing to be performed using standard performance analysis techniques.

As well as the size of the packet capture affecting the amount of storage and bandwidth required to upload the packet capture, the number of packets within a packet capture is also significant, as it is a significant factor in determining how much CPU processing power is required to analyze and otherwise process the packet capture, so it is in fact advantageous to remove small (i.e. in terms of number of bytes) packets even if this does not make a significant different to the compressed packet capture file size.

As indicated earlier, a "pcap" (or "Packet CAPture", or "PCAP") file is a file in a binary file format that enables the storage of network packets that have been captured on a network interface, in particular for the purpose of performing diagnostic analysis of Local Area Network (LAN) diagnostic data. The pcap file format can encode many types of network packets including 802.11 (Wi-Fi) packets. The pcap file format is also extensible (meaning it allows for custom extensions to be added to the format). A process running on a network device can read network packets from a network interface, encode the packet data into the pcap file format and then write a representation of the packet to a pcap file. The pcap file can be used in other processes to post-analyze network packets that have been received at the network interface.

Pcap files can get very large if a large amount of packets have been received at the network interface. Various compression techniques can be used to reduce the size of the pcap file. Some compression techniques are "lossless", meaning that do not lose information (e.g. GZIP) while others are "lossy", meaning that they do lose information. There is normally a trade-off between the compression ratio and the amount of information lost (i.e. as the compression ratio increases the amount of information loss increases).

In 802.11 Wi-Fi networks the Network Interface (together with the Wi-Fi Driver software loaded into the Network Interface) implements the Data Link Layer (Layer 2) and the Physical Layer (Layer 1) of the OSI seven layer model. The 802.11 Network Interface can be configured in a number of modes including a mode referred to as "Monitor Mode". Monitor Mode allows the 802.11 Network Interface to capture single wireless transmissions from the Physical Layer in the form of an 802.11 Physical-Layer Protocol Data Unit (PPDU), decode it and present it to the Media Access Control (MAC) sublayer of the Data Link Layer as a series of one or more MPDUs (i.e. Wi-Fi MAC Protocol Data Units). The contents of an MPDU together with other information associated with the MPDU such as the timestamp, the physical rate, signal strength, etc. are then presented to a Network Process listening on the Network Interface to encode and write the packet data to the pcap file.

An Aggregated-MPDU (A-MPDU) aggregates multiple MPDUs into a single wireless transmission that is sent over the air in one PPDU. When the Network Interface reads the PPDU containing an A-MPDU from the air interface it processes the A-MPDU by extracting each MPDU from the A-MPDU, generating the additional information for each MPDU and placing the information in a RadioTap header (information about which is available online, e.g. from www.radiotap.org) that it associates with the MPDU. Along with other information the RadioTap header also holds information relating to whether the MPDU was part of an A-MPDU. RadioTap A-MPDU information includes a unique reference identifier for each A-MPDU so that higher level processes can determine which A-MPDU a specific MPDU belonged to and also whether the MPDU was the last MPDU in the A-MPDU. It then sends each MPDU and the associated RadioTap header in turn to the Network Interface processing listening on the Network Interface. The Network Process can therefore use the A-MPDU information held in the RadioTap header to implement efficiencies when generating the pcap file by re-aggregating the multiple MPDUs belonging to an A-MPDU into a single Summary MPDU that is written to the pcap file.

A-MPDU Contents:

As defined in the 8021.11 specification an A-MPDU contains multiple MPDUs. The specification limits what class of MPDUs the A-MPDU can contain, specifying the following, which would therefore apply in respect of preferred embodiments:

All MPDUs in the A-MPDU must have the same Transmitter Address and Receiver Address;

Only QoS Data MPDUs and MAC Management Protocol Data Units (MMPDUs) can form part of an A-MPDU;

All QoS MPDUs in an A-MPDU must have the same QoS value.

A QoS Data MPDU is a specific type of MPDU that holds data (as opposed to other MPDUs that hold management or control information). A QoS Data MPDU can either be sent over the air, in its own single wireless transmission, or grouped together with other MPDUs before being sent in a single wireless transmission (i.e. as an A-MPDU). When a single wireless transmission reaches a network interface the network interface driver software will examine it and if it is an A-MPDU will separate it back into its separate MPDUs before passing them on individually to any processes reading from the network interface.

Some embodiments take advantage of the fact that it is possible to identify whether each QoS Data MPDU received formed part of an A-MPDU transmission or not (as will later be discussed in more detail with reference to the flow-chart of FIG. 4). Being able to identify that a QoS Data MPDU formed part of an A-MPDU allows preferred embodiments to aggregate a number of QoS Data MPDUs back into a single record that can be written to a pcap instead of writing multiple records (one for each QoS Data MPDU). This mechanism results in a saving of storage space for the pcap file as well as allowing a decoder process to decode the pcap back into the (almost) original MPDU representation (as will later be discussed with reference to FIG. 3).

Figure 4:
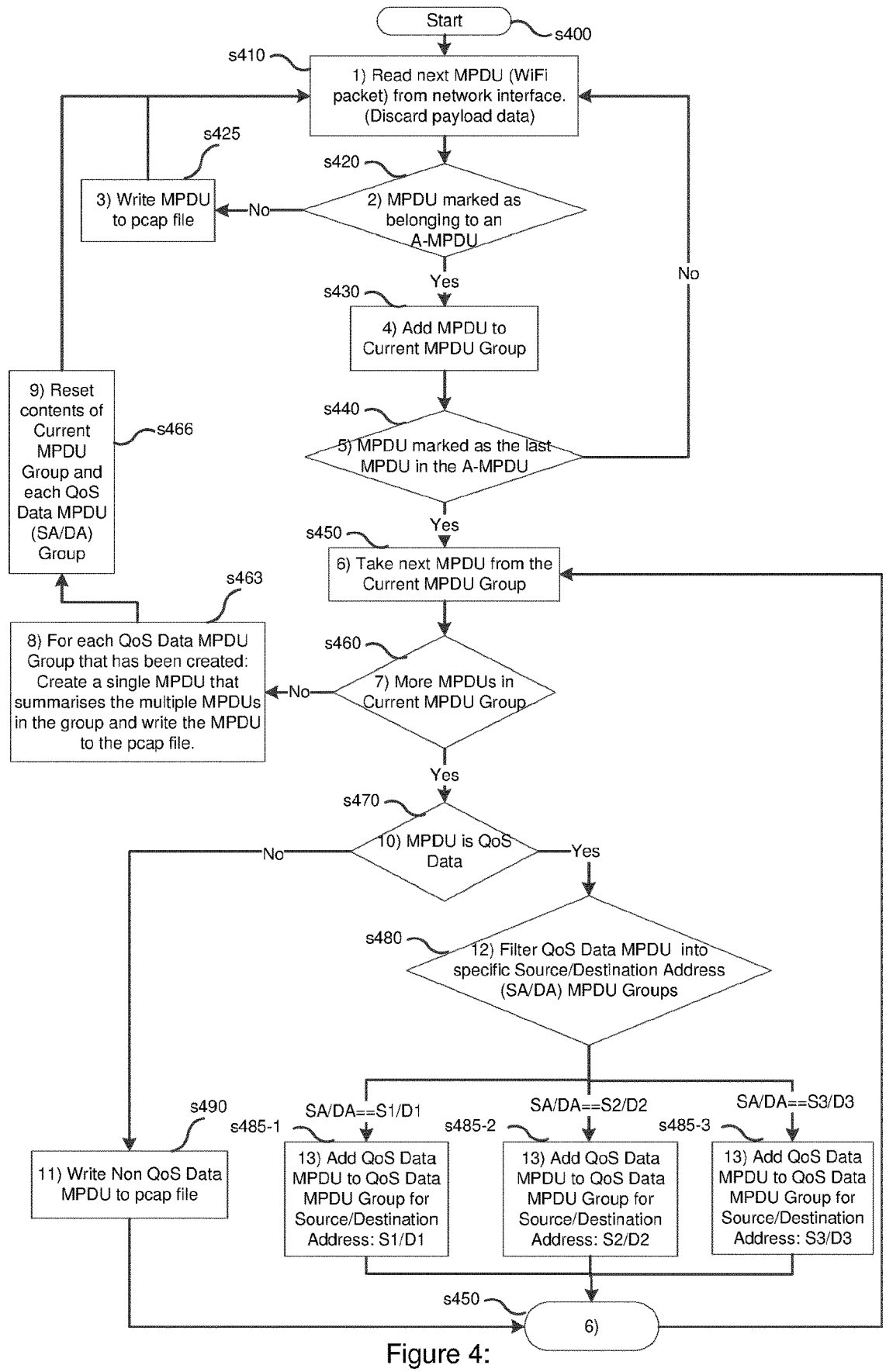
FIG. 4 is a flow-chart illustrating the processing of MPDUs to form a pcap file according to one embodiment.
Figure 5:
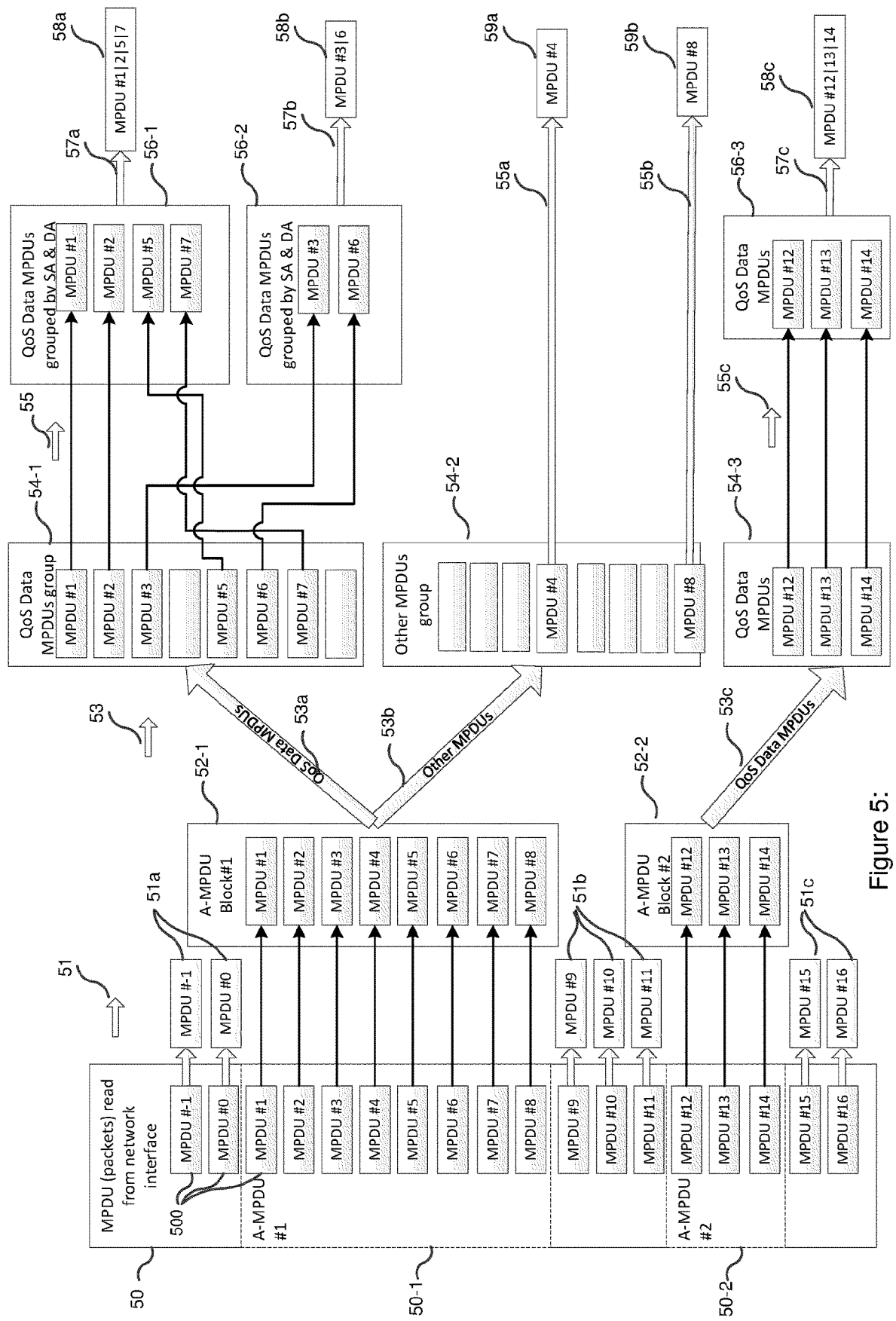
FIG. 5 shows an example of the process-flow which might result when a method according to that of FIG. 4 is used in relation to a number of received MPDUs.

An explanation of a method according to one embodiment of the disclosure will now be provided, with reference primarily to the flow-chart shown in FIG. 4, but also with reference to the other figures and in particular to FIG. 5, which shows an example of the process-flow which might result when a method according to that shown in FIG. 4 is used in relation to a number of received MPDUs.

It will be noted that some or all of the operations of such a method may be implemented in an entity such as the monitoring unit 106 shown in FIG. 1, which may be a module of (or a module associated with) a device such as LAN Gateway device 104 shown in FIG. 1.

FIG. 2 illustrates the primary entities which may be comprised in such a monitoring unit 106, and shows that this has an 802.11 Network Interface 24 having an 802.11 Driver 241 therein. The 802.11 Network Interface 24 has an air (or wireless) interface 22 with the 802.11 (wireless) network 20 in question.

As will be explained in more detail later, an A-MPDU Encode Process module 26 of the monitoring unit in question is arranged to receive MPDUs 25 (i.e. over the air 802.11 packets) via the 802.11 Network Interface 24 and encode these MPDUs (i.e. runs the encoding process according to preferred embodiments) into a pcap file 28, which may then be subjected to further compression using standard compression algorithms and/or uploaded (via an associated LAN Gateway device 104) for analysis elsewhere. If multiple MPDU packets 25 were received that were detected to form part on an A-MPDU then the A-MPDU Encode Process module 26 would be able to produce a pcap file 28 smaller in size than it would have otherwise been able to produce.

FIG. 3 illustrates at a high-level how captured packets received in a wireless network may be formed into a pcap file of smaller size than would be the case without using a method according to a preferred embodiment while ensuring that the pcap file so produced can subsequently be decoded to form another pcap file with the original MPDUs restored (in a lossy way, but in a way that permits analysis using standard pcap analysis techniques, and having preserved the data of relevance to such analysis techniques).

In s30, packets are received/captured in a wireless network.

In s32, the captured packets are subjected to an A-MPDU encoding process, resulting in a pcap file of smaller size than usual being produced (step s34). This may then be subjected to further compression using standard compression algorithms and/or uploaded for analysis elsewhere.

In s36, the A-MPDU encoded pcap file (generally after being compressed ready for transmission, transmitted for analysis elsewhere, then decompressed) may be subjected to an A-MPDU decoding process, resulting in a pcap file in "standard" pcap format being produced that permits analysis using standard pcap analysis techniques, the data of relevance to such analysis techniques having been preserved despite the reduction in size of the pcap file during the processing (and any transmission) thereof.

Referring now to FIG. 4, this is a flow-chart illustrating the processing of MPDUs to form a pcap file according to one embodiment. The following describes the process according to a preferred embodiment, starting from a "Start" at s400.

(1) At s410, a Network Process is implemented that listens on an 802.11 Wi-Fi Network Interface running in Monitor Mode. The Network Interface captures single wireless transmissions (in the form of PPDUs) as they transit the 802.11 air interface and examines each PPDU as it is received. When a PPDU is received it extracts the MPDU(s) (or "WiFi packet(s)") of which the PPDU is comprised, and for each MPDU decoded it adds a "RadioTap header" which labels the MPDU with additional information. The RadioTap header specifies fields such as: Timestamp, Physical Layer (PHY) Rate, Signal Strength etc. If the PPDU decoded by the Wi-Fi Driver is an A-MPDU, the RadioTap header would also include an A-MPDU status field. In this case the A-MPDU status field contains a unique reference identifier allocated to the A-MPDU so that each MPDU can be identified as belonging to a specific A-MPDU transmission. The A-MPDU status field also indicates whether this MPDU is the last MPDU in the current A-MPDU transmission. Once the RadioTap header has been associated with the MPDU both the MPDU and RadioTap header are presented to the Network Process to be processed further.

The MPDUs received from the network interface are read one by one. (NB The payload data may be discarded as it is not of relevance to performance analysis in respect of the wireless network.)

It should be noted that all of the MPDUs in a single A-MPDU should be continuous, with only one A-MPDU being processed at any one time.

It should be noted that a radio network interface card of a wireless router device or other such Gateway Device may support multiple interfaces (e.g. it can have one interface acting as an Access Point or station and another interface which is in Monitor Mode). In Linux, for example, an interface device (e.g. an 802.11 radio network interface card) can support multiple logical interfaces (e.g. Access Point or Monitor at the same time). Inbound/Outbound traffic may thus be captured on a working interface. Alternatively the radio interface may have just one interface which is running in Monitor Mode only to (passively) capture packets transmitted between other devices. Thus the "monitoring" interface may be running on the same radio network interface card as other interfaces providing Access Point or Station functions, or be running on a separate one.

(2) At s420, a test is carried out on the MPDU RadioTap header of the current MPDU to determine if it was part of an A-MPDU or not. This is done by looking for an A-MPDU status field in the RadioTap header, or other such mark or indication that the current MPDU belongs to an A-MPDU.

(3) If the MPDU is not (marked as) part of an A-MPDU, the process then proceeds via s425, in which the Network Process takes the MPDU in question, encodes it into the pcap format and writes it to a pcap file (as would normally be done). The process then returns to s410 and waits for the next MPDU to process.

The process above may be carried out in the normal manner for 802.11 packet processing. The overall process according to the present embodiment differs from this by virtue of the following:

(4) If the MPDU is (marked as) part of an A-MPDU, the process then proceeds via s430, in which the MPDU is added to the Current MPDU Group. (NB If this is the first MPDU in the Current MPDU Group then this will involve creation of the Current MPDU Group.) It should be noted that all MPDUs in an A-MPDU are guaranteed to have the same Transmitter and Receiver Addresses (TA & RA).

(5) At s440, the Network Process tests to see if the current MPDU is the last MPDU in the A-MPDU. If not, the process returns to step s410 and waits to receive the next MPDU in the A-MPDU. If it is the last MPDU in the A-MPDU the process proceeds to s450.

(6) At s450, the Current MPDU Group contains the whole set of MPDUs that were transmitted in the A-MPDU. The contents of the Current MPDU Group is now looped through s460 to s490 in order to allocate each MPDU in the Current MPDU Group into one of a number of QoS Data (and possibly other) MPDU Group sets:
  a. A set containing all the non-QoS Data MPDUs in the Current MPDU Group (steps s470 and s490).
     (NB The non-QoS Data MPDUs need not be allocated to a set before being written to the pcap file, The may simply get written to the pcap file immediately, without being allocated into a set.)
  b. A number of sets containing QoS Data MPDUs with the same Source Address/Destination Address (SA/DA) tuple (s470, s480 and s485).

(7) At s460, if there are more MPDUs in the Current MPDU Group to process, the process proceeds to s470. If not, the process proceeds to s463.

(8) At s463, for each QoS Data MPDU set (i.e. there will be one set for each unique (SA/DA) tuple), a single MPDU is created that summarizes the multiple MPDUs in the set. This MPDU is then written to the pcap file, and the process proceeds to s466.

(9) At s466, the contents of the Current MPDU Group is reset and each QoS Data MPDU (SA/DA) set to empty. The process then returns to s410 and waits for the next MPDU.

(10) If it was found at s460 that there were more MPDUs in the Current MPDU Group to process, the process reaches s470, at which it is tested whether the MPDU in question is a QoS Data MPDU. If it is, the process proceeds to s480. If not, the process proceeds to s490.

(11) If it was found at s470 that the MPDU in question was not a QoS Data MPDU, the process proceeds to s490, at which the non-QoS Data MPDU is written to the pcap file. The process then proceeds back to s450. It will be noted that other MPDUs in the same A-MPDU may include Management MPDUs that are also being sent between the same TA and RA as the QoS Data packets.

(12) If it was found at s470 that the MPDU in question was a QoS Data MPDU, the process proceeds to s480, at which the QoS Data MPDU is filtered into a specific SA/DA tuple.

(13) In strands s485-1, s485-2 and s485-3 (depending on the SA/DA tuple), which together make up and will be referred to for brevity as s485, the QoS Data MPDU is allocated to the relevant QoS Data MPDU set (i.e. depending in this example on whether the SA/DA=S1/D1 or S2/D2 or S3/D4). The process then proceeds back to s450 to process the next MPDU in the A-MPDU.

It should be noted that at s463, the Network Process may implement the compression of multiple QoS Data MPDUs that form part of an Aggregated-MPDU (A-MPDU) into a single QoS Data Summary MPDU that represents a summary of the multiple QoS Data MPDUs that form the A-MPDU. As a single QoS Data Summary MPDU is written into the pcap file instead of the multiple QoS Data MPDUs, it results in a reduction in the number of MPDUs stored in the pcap file and the overall size of the pcap file.

Note that this embodiment proceeds on the basis that the payload data held in the QoS Data MPDUs is not captured and only the QoS Data MPDUs header information is stored. As well as the payload data, the process also loses some header information that was held in the multiple QoS Data MPDUs, but it still holds enough information for a pcap file decompression process to reproduce a reasonable representation of the multiple QoS Data MPDUs in the original capture so that representative Wi-Fi network metrics can be derived.

It will be appreciated that the overall process would generally compress multiple QoS Data MPDUs that form part of an A-MPDU into a single QoS Data Summary MPDU.

If the number of QoS Data MPDUs in a single A-MPDU is high (e.g. there can be up to 64 MPDUs in a single A-MPDU) then a high compression ratio can be achieved.

802.11 QoS Data A-MPDU Identification

In order to identify the QoS Data MPDUs that form part of an A-MDPU (and ignore other packets) as described in the filtering stages (steps s410 and s470), the following MPDU fields may be used:
  RadioTap Header Fields:
    A-MPDU reference number is present (so this MPDU forms part of an A-MPDU) IEEE 802.11 QoS data:
      Type/Subtype=QoS Data (this identifies the MPDU as a QoS Data MPDU) 802.11 QoS Data A-MPDU Grouping In order to group multiple QoS Data MPDUs into a single aggregated QoS Data Summary MPDU (described in Stage (8) above) the following MPDU fields may be used:
  RadioTap Header Fields:
    A-MPDU reference number (NB each A-MPDU has a unique reference number) IEEE 802.11 QoS data:
    Receiver address
    Destination address
    Transmitter address
    BSS Id
    Source address
    QoS Control: 0x0000
      TID
      Priority Pcap File Format Extensions A possible design will now be described which may allow the pcap file format to encode multiple QoS Data MPDUs into a single aggregated QoS Data Summary MPDU (described above in s463). It uses a RadioTap Vendor header extension field (see www.radiotap.org to encode all the information necessary to allow decoding of the QoS Data Summary MPDU into a lossy representation of the original multiple QoS Data MPDUs.

The RadioTap Vendor header extension field encodes the QoS Data Summary MPDU as follows:

RadioTap header Vendor Fields:
Number of individual QoS Data MPDUs that are represented by this QoS Data Summary MPDU
Total frame size of all the QoS Data MPDUs that the QoS Data Summary MPDU represents
The sequence number of the first QoS Data MPDU represented by this QoS Data Summary MPDU
A bitmask (representing up to 64 QoS Data MPDUs) indicating the sequence number of each member QoS Data MPDU
A bitmask (representing up to 64 QoS Data MPDUs) indicating the retry flag of each member QoS Data MPDU.

Referring now to FIG. 5, this shows an example of the process-flow which might result when a method according to that shown in FIG. 4 is used in relation to a number of received MPDUs. The process flow generally runs from left to right in this figure, but it will be noted that the process first proceeds from top-left to top-right (in respect of the MPDUs received earliest, which are shown at the top of Box 50), before proceeding from left to right in respect of MPDUs received later.

Box 50 symbolizes a number of received MPDUs (packets) received via and read from a network interface (such as the 802.11 Network Interface 24 in FIG. 2). The first three of these MPDUs are marked with reference numeral 500, but this is not repeated for each to avoid unnecessarily cluttering the figure. Of the eighteen received MPDUs shown, eight (MPDUs #1 to #8) belong to a first Aggregated-MPDU, referred as A-MPDU #1 (marked with reference numeral 50-1). Three more (MPDUs #12 to #14) belong to a second Aggregated-MPDU, referred as A-MPDU #2 (marked with reference numeral 50-2). The remaining MPDUs of those received (i.e. MPDUs #−1 to #0, #9 to #11, and #15 to #16) do not belong to an Aggregated-MPDU.

As noted previously, the MPDUs in a single A-MPDU are continuous.

(1) In a first stage of the process flow, the individual MPDUs (packets) are read from the network interface.

(2) If a packet/MPDU does not belong to an A-MPDU, it is written to the pcap file without further processing, as denoted generally by arrow 51. This is shown happening in respect of MPDUs #−1 and #0 in 51a, then later (as discussed in (9) below) in respect of MPDUs #9 to #11 in 51b, and after that (as discussed in (13) below) in respect of MPDUs #15 to #16 in 51c.

The MPDUs that do belong to an A-MPDU are grouped into an A-MPDU block (as is shown happening in respect of MPDUs #1 to #8, which are grouped into A-MPDU Block #1 (52-1), and later in respect of MPDUs #12 to #14, which are grouped into A-MPDU Block #2 (52-2).

(3) When all the MPDUs belonging to an A-MPDU have been read, they are filtered (denoted generally by arrow 53) according to the following rules:
If (MPDU is QoS Data)
Add to QoS Data MPDUs group [ . . . i.e. as indicated by arrow 53a . . . ]

Else
Add to Other MPDUs group [ . . . i.e. as indicated by arrow 53b . . . ]

(4) Following on from this, the QoS Data MPDUs (i.e. those in QoS Data MPDU group 54-1, noting that the QoS Data MPDUs in this group are guaranteed to have the same Transmit Address (TA) and Receive Address (RA)) are then grouped by their Source Address (SA) and Destination Address (DA), as denoted generally by arrow 55. In this example, this results in QoS Data MPDUs #1, #2, #5 and #7 being grouped (by SA & DA) into a group with reference numeral 56-1, and in QoS Data MPDUs #3 and #6 being grouped (by SA & DA) into a group with reference numeral 56-2.

It will be noted that QoS Data MPDUs in these groups are all being sent between the same TA, RA, SA and DA.

(5) Finally (in relation to the MPDUs shown in the top section of FIG. 5), a summary MPDU 58a that summarizes the QoS Data MPDUs from the group 56-1 is created and written to the pcap file (as indicated by arrow 57a).

(6) Similarly, a summary MPDU 58b that summarizes the QoS Data MPDUs from the group 56-2 is created and written to the pcap file (as indicated by arrow 57b).

Looking next at how the MPDUs that were added to the "Other MPDUs" group 54-2, it will be noted that the "Other MPDUs" may include Management MPDUs that are also being sent between the same TA and RA as the QoS Data packets. These are not however grouped by SA and DA in the same manner as the QoS Data MPDUs referred to above. They are simply treated as follows:

(7) MPDU #4 is written unchanged (59a) to the pcap file (as indicated by arrow 55a)

(8) MPDU #8 is written unchanged (59b) to the pcap file (as indicated by arrow 55b) Returning now to the left of the figure, and to the processing of the next MPDUs after those that were found to belong to A-MPDU #1, the following processing is shown in respect of MPDUs #9 to #11:

(9) MPDUs #9 to #11 are written to the pcap file (as discussed above and as indicated by arrow 51b).

Returning again to the left of the figure and to the processing of the next MPDUs after MPDUs #9 to #11, the following processing is shown in respect of MPDUs #12 to #14, found to belong to A-MPDU #2 and therefore are grouped into A-MPDU Block #2 (52-2):

(10) When the whole A-MPDU worth of packets has been read, the MPDUs are filtered (denoted by arrow 53c) as above, i.e. according to the following rules:
If (MPDU is QoS Data)
Add to QoS Data MPDUs group [ . . . i.e. as indicated by arrow 53c . . . ]
Else
Add to Other MPDUs group [ . . . i.e. in this instance, none fall into this group . . . ]

This results in three MPDUs (i.e. MPDUs #12 to #14) being added to QoS Data MPDU group 54-3.

(11) Following on from this, the current group of QoS Data MPDUs (i.e. those in QoS Data MPDU group 54-3, noting again that the QoS Data MPDUs in this group are guaranteed to have the same Transmit Address (TA) and Receive Address (RA)) are then grouped by their Source Address (SA) and Destination Address (DA), as denoted by arrow 55c. In this instance, there is only one group, so QoS Data MPDUs #12, #13 and #14 are all grouped (by SA & DA) into a group with reference numeral 56-3.

(12) Finally (in relation to the MPDUs found to belong to A-MPDU #2), a summary MPDU 58c that summarizes the QoS Data MPDUs from the group 56-3 is created and written to the pcap file (as indicated by arrow 57c).

Finally, returning to the left of the figure again and to the processing of the MPDUs after those found to belong to A-MPDU #2, the following processing is shown in respect of MPDUs #15 to #16:

(13) MPDUs #15 and #16 are written to the pcap file (as discussed above and as indicated by arrow 51c).

FIG. 6 is a diagram of a computer system suitable for the operation of embodiments of the disclosure. A central processor unit (CPU) 602 is communicatively connected to a data store 604 and an input/output (I/O) interface 606 via a data bus 608. The data store 604 can be any read/write storage device or combination of devices such as a random access memory (RAM) or a non-volatile storage device, and can be used for storing executable and/or non-executable data. Examples of non-volatile storage devices include disk or tape storage devices. The I/O interface 606 is an interface to devices for the input or output of data, or for both input and output of data. Examples of I/O devices connectable to I/O interface 606 include a keyboard, a mouse, a display (such as a monitor) and a network connection.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the disclosure.

The scope of the disclosure may include other novel features or combinations of features disclosed herein. The applicant hereby gives notice that new claims may be formulated to such features or combinations of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of processing local area network diagnostic data obtained in respect of a local area network, the local area network having at least one user-device located therein operable to communicate via a local area network gateway device with one or more remote devices in a communications network outside the local area network, the local area network gateway device having a wireless interface associated therewith in the local area network, the local area network diagnostic data comprising data packets received via the wireless interface, at least some of which carry performance data in one or more header fields relating to one or more predetermined performance characteristics of the local area network, the method comprising:

identifying from packets received via the wireless interface a plurality of packets each having an indication that the packet belongs to a particular aggregate group of packets;

selecting from the plurality of packets identified as having an indication that the packets to the particular aggregate group of packets at least two packets that carry performance data relating to a performance characteristic of the local area network;

identifying from the at least two packets carrying the performance data relating to the performance characteristic of the local area network, at least one set of two or more packets sharing the same source address and destination address;

replacing packets identified as being in the set of two or more packets sharing the same source address and destination address with a single packet having the shared source address and destination address and having one or more header fields corresponding to the header fields identified as being in the set of two or more packets; and updating the aggregate group of packets from which the at least two packets that carry the performance data were selected by including the replacement packet therein instead of the set of two or more packets having the same source address and destination address.

2. The method according to claim 1, wherein the local area network diagnostic data obtained in respect of the local area network comprises a plurality of packets conforming to a predetermined version of a network protocol.

3. The method according to claim 1, wherein the local area network diagnostic data obtained in respect of the local area network comprises a plurality of packets conforming to a predetermined wireless networking protocol.

4. The method according to claim 1, wherein the single packet having the shared source address and destination address of the two or more packets the single packet replaces includes performance data from at least one of the two or more packets the single packet replaces.

5. The method according to claim 1, wherein the single packet having the shared source and destination address of the two or more packets the single packet replaces includes an indication of a size of the single packet.

6. The method according to claim 5, wherein the indication of the size of the single packet is an indication of at least one of a total number of bytes in the single packet or a number of packets the single packet replaces.

7. The method according to claim 1, wherein the single packet having the shared address and destination address of the two or more packets the single packet replaces includes one or more of the following:

a starting sequence number of the first packet of the plurality of packets each having an indication that the packet belongs to a particular aggregate group of packets;

a bitmask indicating a sequence number of each packet of the plurality of packets each having an indication that the packet belongs to a particular aggregate group of packets; or a bitmask indicating a retry flag of each packet of the plurality of packets each having an indication that the packet belongs to a particular aggregate group of packets.

8. The method according to claim 1, further comprising discarding a payload section of one or more of the plurality of packets each having an indication that the packet belongs to a particular aggregate group of packets.

9. The method according to claim 1, wherein the plurality of packets identified from packets received via the wireless interface and each having an indication that the packet belongs to a particular aggregate group of packets comprises a plurality of Media Access Control Protocol Data Units belonging to the same Aggregated Media Access Control Protocol Data Unit.

10. The method according to claim 1, wherein the at least two packets that carry performance data relating to a performance characteristics of the local area network are Quality of Service Data Media Access Control Protocol Data Units.

11. The method according to claim 1, further comprising combining a plurality of Quality of Service Data Media Access Control Protocol Data Units belonging to the same Aggregated Media Access Control Protocol Data Unit into a single Quality of Service Data Summary Media Access Control Protocol Data Unit.

12. The method according to claim 1, further comprising subjecting one or more updated aggregate groups of packets to compression.

13. The method according to claim 1, further comprising sending one or more updated aggregate groups of packets from the local area network for local area network performance analysis at a remote network diagnostic device in the communications network outside the local area network.

14. The method according to claim 13, further comprising performing local area network performance analysis at the remote network diagnostic device in dependence on the one or more updated aggregate groups of packets from the local area network.

15. An apparatus configured to perform the method according to claim 1.

16. A non-transitory computer-readable storage medium storing a computer program element comprising computer program code to, when loaded into a computer system and executed thereon, cause the computer system to perform the method as claimed in claim 1.

* * * * *